Aug. 31, 1926.

P. DODGE 1,597,773

TEMPERATURE REGULATION

Filed July 2, 1925   2 Sheets-Sheet 1

Inventor
Parker Dodge
by Dodge and Sons
Attorneys

Aug. 31, 1926.

P. DODGE 1,597,773

TEMPERATURE REGULATION

Filed July 2, 1925     2 Sheets-Sheet 2

Inventor
Parker Dodge
by Dodge
Attorney

Patented Aug. 31, 1926.

1,597,773

UNITED STATES PATENT OFFICE.

PARKER DODGE, OF SOMERSET, MARYLAND.

TEMPERATURE REGULATION.

Application filed July 2, 1925. Serial No. 41,133.

This invention relates to temperature regulation and particularly to thermostats of the so-called night and day type designed to maintain a lower temperature during the night hours than during the day hours. Such thermostats may be manually set or may be clock-controlled, and the invention is capable of embodiment in either type.

Where a manually controlled thermostat of this type is applied in a residence to control the action of the heating furnace, it is impracticable to set the thermostat for the night setting until the last member of the household retires. Such member may not be the one responsible for the operation of the heating plant and it frequently results that the thermostat remains set for the day temperature all night.

A similar difficulty is encountered where a clock-controlled thermostat is installed in a residence, for such clock-controlled thermostats start to establish the night temperature at a definite hour, while the habits of the average household are by no means so regular. Consequently, such thermostats are usually set to maintain the day temperature until an hour late enough to cover the occasional extreme case.

The present invention overcomes these difficulties by subjecting the thermostat to a secondary control according to the condition of the lights at some particular point or points in the house, usually the entrance hall or the living room, or both.

In the case of a manually set thermostat subject, for example, to control by the hall and living room lights, the thermostat may be set at any time in the evening to the night setting, but so long as the lights remain burning in either the hall or the living room or both, the day temperature will be maintained. If the thermostat be subject to control by only one lighting circuit, then the day temperature will be maintained so long as this light remains lighted.

Similarly in the case of a clock-controlled thermostat, the clock may be set to shift the thermostat to night setting at an early hour in the evening, say about eight o'clock, but such setting will be neutralized so long as the lights exerting secondary control on the thermostat remain lighted. This gives a flexibility to the clock-controlled thermostat very much to be desired and relieves such thermostat of the commonest cause of derangement, which is frequent adjustment of the timing action.

Broadly stated, in the invention as applied to domestic installations in which a single thermostat, located in a central position, controls the heating plant for the entire house, the thermostat is subjected to control by the circuit of some lamp, not necessarily in the same room with the thermostat. The selection of the lamp for this purpose is determined somewhat by the habits of the family, as it is necessary to select a light which under ordinary conditions will be lighted until the family retires. In most cases the entrance hall light circuit or a living room light circuit, or both may be adopted. The thermostat is so constructed that when shifted manually or by the clock to its night setting, it is yieldingly retained in such setting. The secondary control acts to overpower this yielding tendency and temporarily restores the day setting while the lights are lighted.

In the best embodiment of the invention known to me, the switch which controls the light circuit actuates the mechanism which suspends the day setting. A direct mechanical connection between the switch and the thermostat, while theoretically practicable and where practicable relatively simple, does not meet the requirements of the average installation. In the first place, it is often desired to place the thermostat in a different room from the switch. Even where they can be placed in the same room it is seldom feasible to place them close together, as a direct mechanical connection would require, because the switch ordinarily should be placed near a door while the thermostat should be placed as far away from the door as is practicable to avoid the effect of drafts. Consequently, while I recognize that direct mechanical connection is technically possible, I do not regard it as one of the better embodiments of the invention and hence do not illustrate it.

The best arrangement known to me is to provide an electrical connection between the switch and the thermostat for establishing the day setting when the switch is closed. In the preferred form this is a circuit separate from the lighting circuit, though the current for both is preferably derived from the same source. I illustrate as a modification how the connection between the switch and the thermostat may be through the lighting circuit itself, and such an arrangement, like the direct mechanical connection, is within the broad scope of my invention.

I shall now describe preferred embodiments of the invention in connection with the accompanying drawings which are largely diagrammatic in character. In the drawings:—

Figure 1:
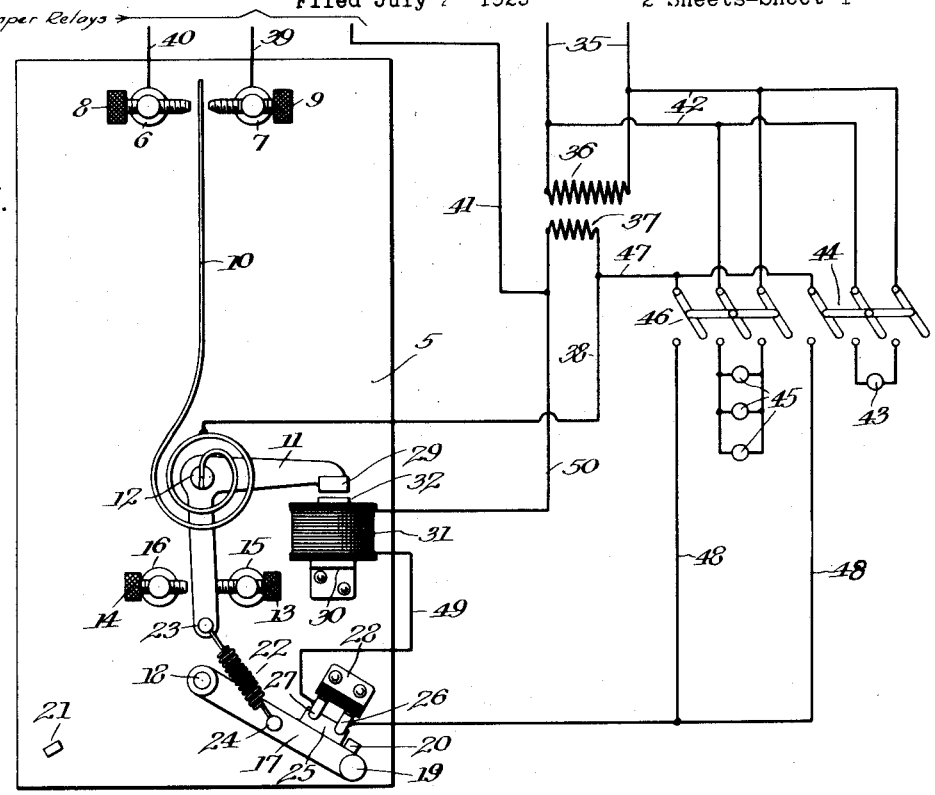
Fig. 1 shows the essential parts of the thermostat in front elevation with the various circuits in diagram.

In Fig. 1, 5 represents an insulating base upon which are mounted two terminal posts 6 and 7. These carry adjustable contact screws 8 and 9 with which a bi-metallic thermostatic bar 10 contacts alternately as it flexes in one direction or the other under changes of temperature. The bar 10 is supported on a bell-crank lever 11 pivoted at 12 to the insulating base 5. One arm of the bell crank 11 swings between two stop screws 13 and 14 which are mounted in studs 15 and 16 on the base 5.

In order to shift the lever 11 to its two limiting positions determined by the stop screws 13 and 14, I make use of a lever 17 which is pivoted at 18 to the base 5 and which is provided with a handle 19 by which it may be manipulated. The lever 17 may swing between two limiting stops 20 and 21 carried by the base 5, and it is connected with the downward extending arm of the bell crank 11 by means of a tension spring 22 which is looped over a stud 23 on the bell crank 11 and over a stud 24 which projects forwardly from the lever 17.

The spring 22 acts as a toggle spring to hold the lever 17 against either the stop 20 or the stop 21. When against the stop 20, it holds the lever 11 in its limiting position against the stop screw 13. This is the low temperature or night adjustment position. When the lever 17 is against the stop 21, the spring 22 holds the bell crank 11 against the stop screw 14. This is the high temperature or day adjustment position.

The lever 17 carries a switch blade 25 which, in the low temperature setting shown in the drawing, bridges and electrically connects two contacts 26 and 27 mounted on an insulating bracket 28 carried by the base 5. The horizontal arm of the bell-crank lever 11 carries an armature 29. Mounted on the base 5 by means of a bracket 30 is an electromagnet whose winding is shown at 31 and whose pole piece 32 is opposed to the armature 29. The parts are so arranged that when the lever 11 is arrested by the stop screw 14 the armature 29 will not quite contact with the pole piece 32.

Electrical thermostats of the type just described are commonly fed with electric current through a step-down transformer from the house mains. The embodiment of the invention shown in Fig. 1 is arranged to derive all the current used in the operation of the thermostat from this one transformer. The house mains are shown at 35. The primary winding of such transformer is shown at 36 and the secondary winding is shown at 37. A lead 38 from the secondary of the transformer is electrically connected with the thermostatic bar 10. This connection is illustrated diagrammatically in the drawings and may be made in any usual manner.

From the contact post 7 there is a connection 39 leading to the relay customarily used with such thermostats and not shown in the drawings, the connection 7 being so connected to the relay that when the thermostatic bar 10 touches the contact screw 9, the relay will operate the heating plant to start to increase the supply of heat. The contact post 6 is connected by a wire 40 with the relay mechanism in such a way that when the bi-metallic bar 10 contacts with the contact screw 8, the relay will set the heating plant to stop or reduce the supply of heat. 41 is the return connection from the relay to the secondary 37 of the transformer.

Branch connections 42 leading from the mains 35 supply the lighting circuits. Two lighting circuits are shown, but more might be used. The light 43, which may be assumed to be the entrance hall light, is controlled by two blades of a three-bladed switch illustrated diagrammatically at 44. The three lights 45, which may be considered as living room lights, are controlled by two blades of a three-bladed switch, illustrated diagrammatically at 46. The third blade of each of the switches 44 and 46 controls circuits through the magnet 31 and the switches are so arranged that these magnet circuits are closed when the respective light circuits are closed by the switches 44 and 46.

These magnet circuits may be traced as follows: The wire 47 leads from the secondary 37 of the transformer to the third blade of each of the switches 44 and 46. Wire 48 lead from the corresponding switch contacts to the contact 26. A wire 49 leads from the contact 27 to the winding 31 of the magnet and a wire 50 leads from the other terminal of this winding back to the secondary 37 of the transformer.

The operation of the device may be readily traced. When the temperature rises, the bar 10 swings to the left, touches the contact screw 8 and through the connection 40 actuates the relay to stop or reduce the supply of heat. When as a consequence the temperature falls, the bar 10 will swing to the right and contacting with the screw 9 will actuate the relay through the connection 39 to start or increase the supply of heat. When the arm 17 is against the stop 21, the day setting is in effect, the bar 10 being adjusted to a position nearer the contact 9 which starts the supply of heat. Under such adjustment the circuit through the magnet 31 is broken between the contacts 26 and 27. This saves useless expenditure of current, for obviously when the day setting is in effect there is no function which the magnet 31 can perform. If desired, however, the contacts 26 and 27 and the switch blade 25 may be omitted, in which case the wire 48 will be connected directly to the wire 49.

When the lever 17 is against the stop 20, as shown, the circuit is closed at the contacts 26 and 27. If both the switches 44 and 46 are open, so that the lights 43 and 45 are out, the magnet 31 will be inert and the spring 22 will hold the lever 11 against the stop 13, establishing the night or low temperature setting. This condition exists provided both the switches 44 and 46 are open, but if either or both of these switches be closed to light the lights 43 or 45, or both, the magnet 31 will be energized and will draw down the armature 29, thus establishing the day or high temperature setting of the thermostat so long, and only so long, as the lights remain lighted.

I desire to point out that the circuits fed from the secondary of the transformer are in effect distinct from the light circuits and where it is not feasible to use a transformer any suitable other source of electric energy might be substituted without departing from the invention.

Figure 2:
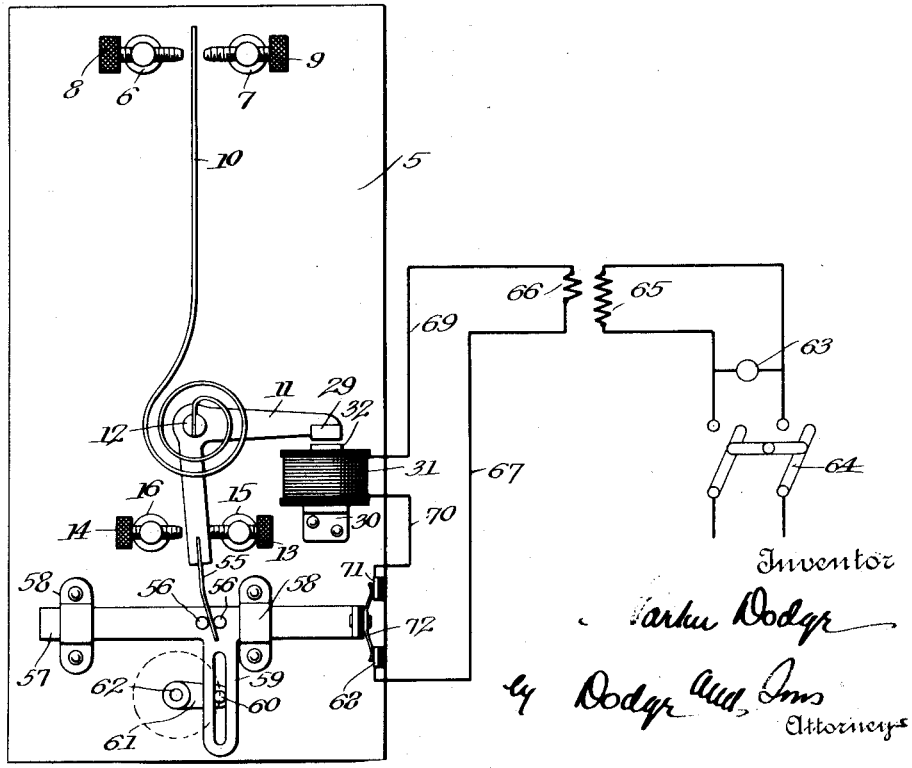
Fig. 2 is a similar view showing a modification.

In Fig. 2 I illustrate modifications of detail which may be adopted in special cases if preferred. The parts numbered 5 to 16 inclusive and the parts numbered 29 to 32 inclusive are essentially the same in form and function as those already described. In place of the spring 22 I make use of a flexible leaf spring 55 which is rigidly mounted in the lower arm of the bell crank 11 and which projects between two studs 56 on a bar 57. This bar is horizontally slidable in guides 58 on the base 5 and carries a depending slotted arm 59. The arm 59 is engaged by a crank pin 60 on an arm 61. The arm 61 is fast on a shaft or arbor 62 which forms a part of the clock work motor of a known clock controlled mechanism. I therefore do not consider it necessary to illustrate the clock mechanism in detail. Such mechanisms are used extensively to shift night and day thermostats, and the function of such a clock mechanism in the present combination is no different from what it is in any clock controlled thermostat.

It suffices to explain, therefore, that the arm 61 swings through 180° each time it is released by the clock. For example, in the evening it moves to the position shown, to establish the night setting, and in the morning moves to a position 180° therefrom to establish the day setting. The spring 55 supplies the necessary resilience to compensate for adjustment of the screws 13 and 14 and also to permit the arm 11 to shift when the magnet 31 is excited.

In this case the exciting current of the magnet 31 is derived directly from the light circuit itself. The light is shown at 63 and the controlling switch at 64, instead of from the house mains. In parallel with the light 63 is the primary 65 of a small transformer. The secondary 66 of this transformer is connected by a wire 67 with the contact 68 and by a wire 69 with one terminal of the winding on the electromagnet 31. The other terminal of such winding is connected by a wire 70 with a contact 71 similar to the contact 68. The contacts 68 and 71 are bridged by a bow spring contact 72 carried by the sliding member 57 and insulated therefrom. Consequently, the magnet 31 can be energized only when the clock sets the thermostat to night temperature position.

Obviously this clock mechanism might be substituted for the manual setting mechanism shown in Fig. 1, or the manual setting mechanism shown in Fig. 1 might be substituted in Fig. 2.

Figure 3:
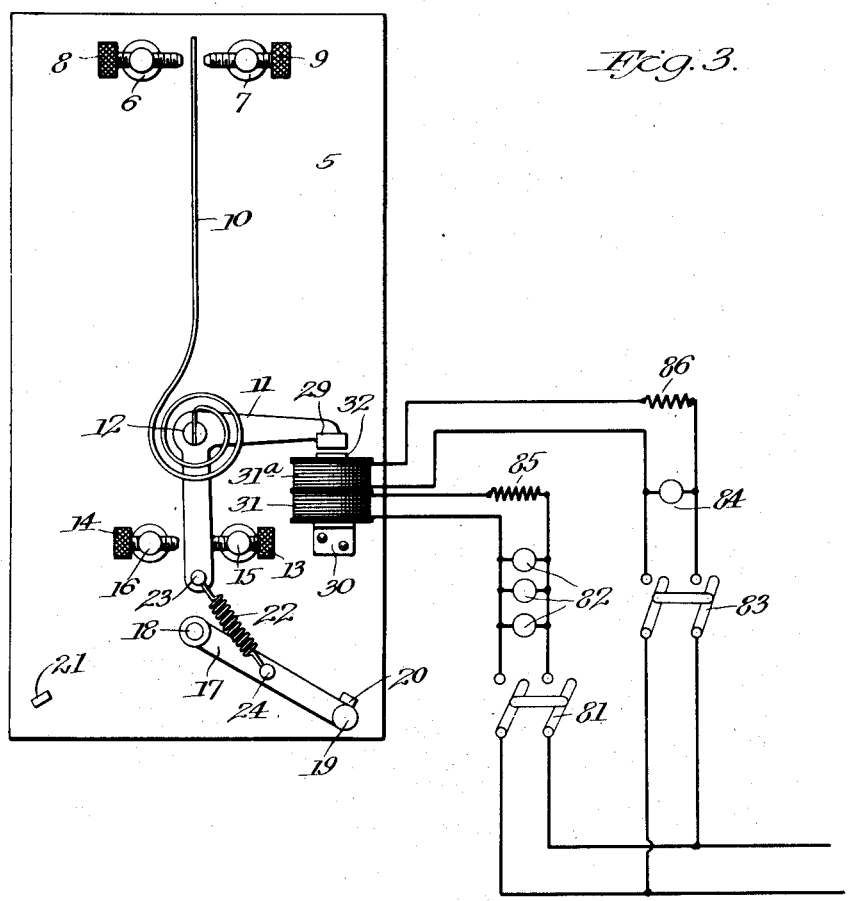
Fig. 3 is a similar view showing a further modification.

In Fig. 3 I show a mechanism which, because it avoids the use of transformers, may be used with either direct or alternating current. In this modification, as in Fig. 2, the current for exciting the electromagnet is derived directly from the lighting circuit, but in this example the current is taken through resistance instead of a transformer. In some cases it is desired in such an installation to control the thermostat by two different lighting circuits and yet maintain these two circuits entirely distinct. Fig. 3 shows how this may be done by using two separate windings on the electromagnet. In this figure the parts numbered 5 to 24 inclusive are identical with the similarly numbered parts in Fig. 1. The parts numbered 25 to 28 are omitted, together with their function, chiefly to illustrate specifically the possibility of omitting them in any case if desired.

The armature 29, the bracket 30 and the pole piece 32 are essentially the same as before. The pole piece 32 carries two windings, one of which is numbered 31 and the other 31$^a$. Two light circuits are shown, the first including the controlling switch 81 and a plurality of lights 82, and the second of which includes the switch 83 and a single light 84. The winding 31, together with a resistance 85 which may or may not be external to the winding 31 but preferably is external to reduce the heating effect on the thermostat, is connected in parallel with the lamps 82. The winding 31ª, together with a resistance 86 which may or may not be external to the winding 31ª, is connected in parallel with the lamp 84.

The operation of the device will be readily understood, it being premised that the windings 31 and 31ª are so connected that they are excited in the same sense or otherwise arranged so as never to neutralize each other. Thus when either switch 81 or 83 is closed, or if both are closed, the armature 29 is drawn down, establishing the day setting.

Obviously various modifications and changes of detail, in addition to those specifically suggested, may be made and consequently I do not limit myself to the specific structure or structures illustrated except to the extent specified in the claims. As a specific example, various dynamo-electric devices might be substituted for the electromagnet, and in the claims I refer to the winding 31 as a dynamo-electric winding to cover broadly any equivalent device for converting electrical into mechanical energy.

What is claimed is:—

1. The method of controlling the temperature of a room equipped with artificial lighting means and with a temperature controlling thermostat arranged to maintain one temperature during day hours and another during night hours which consists in subjecting said thermostat to a modifying control exerted by said lighting means according as the same is or is not active.

2. The method of controlling the temperature of a room equipped with artificial lighting means and with a temperature controlling thermostat arranged to maintain one temperature during day hours and another during night hours, which consists in subjecting said thermostat to modifying control by said lighting means in such manner as to inhibit the maintenance of the night temperature while the lighting means are active.

3. The combination of an adjustable temperature-regulating thermostat; a lighting circuit; and means associated with said lighting circuit responsive to the condition thereof and serving to control the adjustment of said thermostat according to the condition of said lighting circuit.

4. The combination of a temperature-regulating thermostat adjustable between two characteristically different settings; a primary adjusting means constructed and arranged to shift said thermostat alternately between said two adjustments; a secondary adjusting means operable without change of the primary means to suspend temporarily one of said adjustments and establish the other; a lighting circuit; and an actuating connection between said lighting circuit and said secondary adjusting means.

5. In a night and day thermostat, the combination of a temperature-controlling thermostatic unit; primary means for adjusting said unit alternately to establish two different temperatures; a secondary adjusting means operable to impose a definite adjustment on said thermostatic unit regardless of the setting of said primary adjusting means; a lighting circuit; and means for controlling said lighting circuit and said secondary adjusting means conjointly.

6. In a night and day thermostat, the combination of a temperature-controlling thermostatic unit; primary means for adjusting said unit to establish alternately two different temperatures; a light circuit; and a secondary adjusting means associated with said circuit and arranged to impose a definite adjustment on said thermostatic unit regardless of the setting of said primary adjusting means, when said circuit is in a given condition.

7. In a night and day thermostat, the combination of a temperature-controlling thermostatic unit; primary means for adjusting said unit to establish alternately two different temperatures; a plurality of light circuits; and a secondary adjusting means associated with said circuits and arranged to impose a definite adjustment on said thermostatic unit regardless of the setting of said primary adjusting means when any of said circuits is in a given condition.

8. In a night and day thermostat, the combination of a temperature-controlling thermostatic unit; an adjustable member shiftable to vary the temperature maintained thereby; stops limiting the movement of said member and serving to define alternative settings thereof; a setting member shiftable to urge said movable member yieldingly against said stops alternately; a lighting circuit; a switch controlling the same; and means rendered active by the movement of said switch to one position and when active serving to hold said member against one of said stops regardless of the position of said shiftable member.

9. In a night and day thermostat, the combination of a temperature-controlling thermostatic unit; an adjustable member shiftable to vary the temperature maintained thereby; stops limiting the movement of said member and serving to define alternative settings thereof; a setting member shiftable to urge said adjustable member yieldingly against said stops alternately; a lighting circuit; a dynamo electric winding capable when energized of holding said adjustable member against one of said stops regardless of the position of said setting member; a circuit including said winding;

and a switch controlling the energization of both said circuits.

10. In a night and day thermostat, the combination of a temperature-controlling thermostatic unit; an adjustable member shiftable to vary the temperature maintained thereby; stops limiting the movement of said member and serving to define alternative settings thereof; a setting member shiftable to urge said adjustable member yieldingly against said stops alternately; a lighting circuit; a dynamo electric winding capable when energized of holding said adjustable member against one of said stops regardless of the position of said setting member; and means for controlling said lighting circuit and said winding conjointly.

11. The combination of an adjustable temperature-regulating thermostat; a lighting circuit; a dynamo-electric winding connected to be excited and de-energized with changing conditions of excitation of said lighting circuit; and adjusting means for said thermostat arranged to be shifted alternately by the motor action of said winding.

12. In a night and day thermostat, the combination of a temperature-controlling thermostatic unit; primary means for adjusting said unit to establish alternately two different temperatures; a light circuit; and secondary adjusting means for said thermostat including a dynamo-electric winding related with said light circuit arranged to suspend the night adjustment of said thermostat while said light circuit is energized.

13. In a night and day thermostat, the combination of a temperature-controlling thermostatic unit; primary means for adjusting said unit to establish alternately two different temperatures; an electrical supply line; a light circuit adapted to be fed thereby; a transformer having a primary winding fed by said line and a secondary winding; a secondary adjusting means for said thermostat including a dynamo-electric winding for actuating said means; a circuit including said dynamo-electric winding and the secondary winding of said transformer; and a switch controlling the last named circuit and said light circuit.

14. In a night and day thermostat, the combination of a temperature-regulating thermostat of the electric switch type; primary adjusting means for said thermostat for establishing alternately two different temperatures; an electrical supply line; a transformer having a primary winding fed by said line and a secondary winding; a circuit fed by said secondary winding and controlled by the switching action of said thermostat; a light circuit fed by said supply line; a secondary adjusting means for said thermostat including a dynamo-electric winding for actuating said means; a circuit including said dynamo-electric winding and the secondary winding of said transformer; and a switch controlling the last-named circuit and said light circuit.

15. In a night and day thermostat, the combination of a temperature-controlling thermostatic unit; primary means for adjusting said unit to establish alternately two different temperatures; an electrical supply line; a transformer having a primary winding fed by said line and a secondary winding; a light circuit fed by said line; a secondary adjusting means for said thermostat including a dynamo-electric winding for actuating said means; a circuit including said dynamo-electric winding and the secondary winding of said transformer; a switch connected to be operated simultaneously with said primary adjusting means and controlling the circuit through said dynamo-electric winding; and a second switch controlling both the last-named circuit and said light circuit.

16. In a night and day thermostat, the combination of a temperature-controlling thermostat; primary means for adjusting said thermostat to establish alternately two different temperatures; a secondary adjusting means for said thermostat including a dynamo-electric actuating winding; and a switch connected with said primary adjusting means and controlling the circuit through said dynamo-electric winding.

17. In a night and day thermostat, the combination of a temperature-controlling thermostatic unit; an adjustable member shiftable to vary the temperature maintained thereby; stops limiting the movement of said member; a setting member shiftable to urge said adjustable member yieldingly against said stops alternately; a dynamo-electric winding capable when excited of holding said adjustable member against one of said stops regardless of the position of the setting member; and a switch controlling the excitation of said winding and itself connected with said setting member.

In testimony whereof I have signed my name to this specification.

PARKER DODGE.